United States Patent [19]

Welsch et al.

[11] 4,172,605
[45] Oct. 30, 1979

[54] CHEMICALLY REACTIVE RECORDING MEDIUM

[75] Inventors: Bernhard J. Welsch, Cary; Nicholas P. Steiner, Chicago; Albert J. Kelley, Fox River Grove, all of Ill.

[73] Assignee: Uarco Incorporated, Barrington, Ill.

[21] Appl. No.: 797,124

[22] Filed: May 16, 1977

[51] Int. Cl.² .................................................. B41L 1/36
[52] U.S. Cl. .............................. 282/27.5; 179/172; 229/69; 427/145; 427/150; 427/153; 427/261; 428/199; 428/201; 428/207; 428/914
[58] Field of Search ................ 282/27.5; 427/146, 150, 427/261, 153, 145; 428/914, 207, 211, 195, 199, 201; 229/69; 179/172

[56] References Cited

U.S. PATENT DOCUMENTS

| | | | |
|---|---|---|---|
| 2,035,768 | 3/1936 | Sherman et al. | 282/27.5 X |
| 3,104,799 | 9/1963 | Steidinger | 229/69 |
| 3,244,550 | 4/1966 | Farnham et al. | 282/27.5 |
| 3,914,511 | 10/1975 | Vassiliades | 427/146 X |
| 3,967,835 | 7/1976 | Ozutsumi et al. | 282/27.5 |
| 3,981,523 | 9/1976 | Maalouf | 282/27.5 |
| 4,036,511 | 7/1977 | Maalouf | 428/914 X |

Primary Examiner—Thomas J. Herbert, Jr.
Attorney, Agent, or Firm—Wegner, Stellman, McCord, Wiles & Wood

[57] ABSTRACT

A ribbon, adapted for use on an impact printer, is provided wherein the ribbon is impregnated with a first substantially colorless substance which acts as a color-former when reacted with a second substantially colorless substance acting as a color-developer, present on a portion of a substrate. Upon the transfer of the color-former from the ribbon to the substrate by impact, a colored image will form on those areas of the substrate which are coated or impregnated with the color-developer. Images may thus be selectively transferred to an interior ply of a multi-ply business forms assembly by the conventional transfer methods without appearing on the exterior, impact receiving ply of such an assembly.

5 Claims, 3 Drawing Figures

U.S. Patent           Oct. 30, 1979           4,172,605
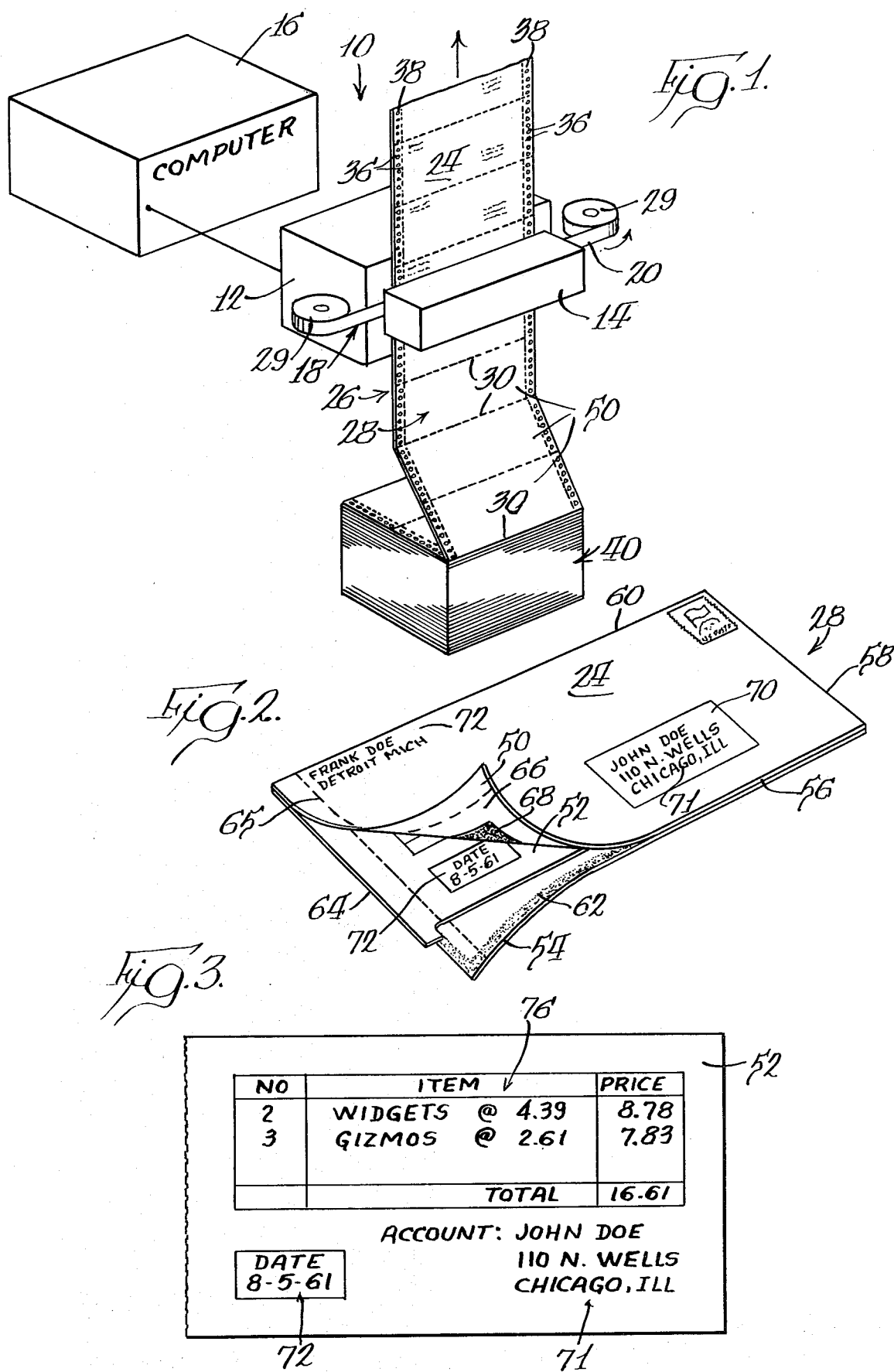

CHEMICALLY REACTIVE RECORDING MEDIUM

BACKGROUND OF THE INVENTION

1. Field of the Invention

This invention relates to image-forming media and, more particularly, to image-forming media used in impact printers such as typewriters or computer printers.

2. Description of the Prior Art

There are many applications where it may be desirable to selectively transfer portions of a printed image to one or more strata of a multi-layer assembly, as for example, a multi-layer, prestuffed envelope assembly as illustrated in Steidinger U.S. Pat. No. 3,104,799. Steidinger's envelope assembly includes a generally rectangular envelope with a front ply and a back ply sealed along a strip coextensive with three peripheral edges of the plies. One or more inserts are located between the front and back plies and are sealed within the envelope.

It is desirable to selectively print information on the front of the envelope assembly as, for example, the addressee's name and address, while simultaneously selectively transferring additional information to one or more of the inserts within the envelope. Such simultaneous selective transfer of printed information eliminates the need to hand- or machine-stuff an envelope, while insuring that an insert is never stuffed into an envelope which bears addressee information inconsistent with the insert, or into a blank envelope subject to being printed with erroneous information. It is desirable to simultaneously print both the information appearing on the outside of the envelope and the information to be transferred to interior plies in a single pass through the printer without causing the information appearing on the interior ply to appear on the outer sheet of the envelope.

Heretofore, this has been achieved through the use of a so-called record ply which overlies the front of the envelope assembly and has all variable information printed thereon by a printing apparatus. That certain variable information to be printed on the front of the envelope is so printed by spot carbon placed either on the back of the record ply or provided on a separate, carbon bearing ply. In areas where the variable information is not to be printed on the face of the outgoing mailer, there is no carbon material, with the consequence that there will be no printing on the face of the envelope.

Heretofore, it has been necessary to provide the record ply as being a means providing a physical record of the transaction which may be retained for future reference or, at the very least, for the purpose of preventing that certain part of the variable information that is to appear only on the interior plies from appearing on the face of the mailer. In the latter case, there is a considerable lack of economy for the user of the stationery assembly.

For one, he must pay for a ply of paper which is not necessary to his business and which must be discarded. He must pay for the cost of discarding the ply, and he must pay for additional freight when the forms assembly containing the additional ply is shipped to him. He must pay the cost of deleaving the record ply from the remainder of the assembly, and his mailings, by reason of the presence of a carbon image forming the address on the face of the outgoing mailer, as opposed to an original impression from a printer, will not appear as individualized as may be desired in a number of instances.

SUMMARY OF THE INVENTION

It is a principal object of the invention to provide a chemically reactive recording medium, such as a ribbon, for use in an impact printer wherein imprinted images may be selectively transferred from the printer to paper or another substrate without requiring physical insulation of the ribbon from portions of the substrate not desired to receive an image.

It is another object of the invention to provide a printing ribbon for use in an impact printer whereby printed images may be selectively transferred to an outer sheet of a multi-sheet assembly with additional information being transferred to interior sheets without requiring physical insulation of the outer sheet from the printer.

It is a further object of the invention to provide a printing ribbon impregnated or coated with a substantially colorless color-forming compound which produces a colored image when combined with a substantially colorless color-developing compound on portions of a substrate.

It is a further object of the invention to provide a method of selectively printing information on the outer sheet of a multi-ply form wherein portions of the outer sheet are sensitized with one of a pair of substantially colorless or transparent and light-colored color-forming materials, the other of the pair being impregnated into or coated on an elongate ribbon carried on an impact printing device whereby the material carried on the ribbon will be transferred, by impact, to the outer sheet, and colored images will be formed only on the sensitized portions of the outer sheet.

It is still another object of the invention to provide a multi-ply business form with front and rear plies, each ply with inner and outer surfaces, and at least one interior ply interposed between the front and rear plies, the outer surface of the front ply being selectively sensitized with a substantially colorless or transparent and light-colored forming material, and a transfer medium on the inner surface of the outer ply at selective locations not corresponding to the locations of the color-forming material on the outer surface of the front ply.

Impacts made upon untreated portions of the substrate will not produce colored images, but will transfer images to inner sheets of the assembly by spot carbon or other transfer methods.

DESCRIPTION OF THE DRAWINGS

FIG. 1 is a somewhat schematic perspective view of a computer-controlled printer provided with a printing ribbon made according to the invention, for selectively imprinting data upon the various plies of a continuous strip of prestuffed envelope assemblies;

FIG. 2 is a perspective view of a sealed envelope assembly with an imprinted insert contained within the envelope, with the sheets of the envelope assembly folded back for clearer illustration; and FIG. 3 is a plan view, on an enlarged scale, of the insert of FIG. 2, more clearly illustrating the printing thereon.

DETAILED DESCRIPTION OF THE INVENTION

Referring to FIG. 1, a computer-controlled printing assembly, generally designated 10, is schematically illustrated. A conventional printer 12 includes type characters 14 and a set of impact hammers (not shown), and the two are conventionally controlled by a computer 16. In response to inputs from the computer, selected impact hammers drive the surface of a suitable substrate, in this case a front surface 24 of continuous business forms assembly 26 of prestuffed envelopes 28, against a ribbon 20, and in turn drive the assembly against the type characters 14. The ribbon 20 is mounted on and conventionally driven between spools 29 to provide a fresh portion of the surface 18 for successive impacts.

The ribbon 20 must be of a material capable of withstanding the impact forces of the printing device, and may be similar to those materials now used in commercial applications, including woven matrices of nylon, rayon, cotton, or various combinations of natural and synthetic fibers. If desired, and if the application permits, the ribbon 20 may be a polyester film, or other film, such as Mylar, for example.

The envelopes 28 are separated from each other by transverse lines of perforations 30. The assembly 26 travels upwardly between the ribbon 20 and the hammers of the printer 12 and is fed by conventional tractors (not shown) which engage pin feed holes 36 in detachable margins 38 extending along both sides of the assembly 26. The assembly 26 is fed from a stack 40 of envelope assemblies 28 folded at alternate perforations 30 in a zig-zag fashion.

In prior printing systems, the ribbon 20 was impregnated with an ink of a suitable color. Ink was transferred from the characters 14 to the front surface 24 by impact with a record ply (not shown) situated between the ribbon 20 and the surface 24 to selectively protect areas of the surface 24.

According to the present invention, the ribbon 20 is not impregnated or coated solely with an ink but, rather, with a color-forming compound which, when combined with at least one color-developing compound, reacts to form a colored image.

It is well known that a colored image may result from the reaction of two or more (preferably two) compounds of certain types. For example, certain leuco dyes react with certain acid-like minerals to form a colored image. Another example is the reaction between certain colorless nickel compounds with rubeanic acid and its derivatives.

One of the compounds used in such a color producing reaction will herein be termed a color-forming agent, and the other compound a color-developer. It is to be understood that these terms are interchangeable with respect to such compounds, and will be used for convenience only.

While substantially colorless compounds are preferred, it is possible to use compounds whose color closely matches that of a particular substrate or which are sufficiently light in color so as to afford a desired contrast with the reacted colored product.

Referring now to FIG. 2, a single prestuffed envelope taken from the assembly 26 is illustrated to more particularly describe one important application of the present invention, and makes use of such color forming reactions. The envelope 28 includes a front ply 50, an insert 52, and a rear ply 54. The front ply 50 and the rear ply 54 are adhered to one another along the edges 56, 58 and 60, as by a thin strip of adhesive 62. The insert 52 is of a size so as to be sealed to the front and rear sheets 50 and 54 at one end 64 only. A line of weakening 65 defines a tear strip by which the envelope 28 may be opened and the insert 52 removed.

When the envelope 28 is still part of the continuous assembly 26, as seen in FIG. 1, the surface 24 of the front sheet 50 is exposed to the ribbon 20. As discussed above, the ribbon 20 of FIG. 1 is saturated or coated with a color-forming compound. The shaded area 70 on the surface 24 is sensitized with a color-developing compound which, when contacted by the color-former of the ribbon upon impact from the printer, creates a colored image. In FIG. 2, the colored image comprises the address 71 appearing within the shaded area 70. (Note that the return address 72 is typically preprinted upon the envelope 28, although such information may be transferred to the front sheet 50 by the same method as is the address 71.)

It should be noted that the color-developer in the shaded area 70 may be saturated into the sheet 50, coated or printed thereon, or contained in microcapsules. In some applications, it is preferred to encapsulate the color-developer to prevent unwanted streaking which may occur in some printers when the ribbon or other material containing a color-former inadvertently touches the area 70.

The rear surface 66 of the front sheet 50 is selectively spot-carboned, and a portion of a spot 68 is shown in FIG. 2. Impacts received on the front surface 24 of the sheet 50 will transfer a carbon image to the insert 64 if the impact occurs over a spot of carbon. For example, the date 72 appears on the insert 64 by virtue of a printer impact upon the front surface 24 of sheet 50 at a point corresponding to the carbon spot 68. However, the date does not appear on the front surface 24 due to the absence of color-developer at that point on the surface 24.

If desired, transfer mechanisms other than the carbon spot 68 may be used. For example, carbon spots on the rear surface 66 of the sheet 50 may be replaced by a microencapsulated color-former and the insert 52 treated with a color-developer, which may alternately be microencapsulated. Alternately, interleaved carbon plies or clear area coated carbon plies, or both, may be used.

Referring now to FIG. 3, the insert 52 of FIG. 2 is more clearly shown. The address 71 appearing on the front sheet 50 has been transferred to the insert 52 due to spot-carboning at the appropriate spot on the surface 66 of the sheet 50.

The invoice information, generally designated 76, has been transferred to the insert 52 by means of impact by the printer upon the surface 24 of the front sheet 50, by other spot carbon (not shown) on the rear surface 66 of the sheet 50. Note that no invoice information appears on the front sheet 50 since the area of the front sheet corresponding to the invoice information was not treated with a color-developer.

There are many pairs of substantially colorless compounds, lightly colored compounds, or compounds which are of various colors which may match a given substrate color, which, when mixed, react to form a product colored differently from either compound in the pair that may be advantageously employed as color-formers and developers in practicing the invention. Examples of particular pairs of such compounds and/or the use thereof in the practice of the present invention follow:

EXAMPLE 1

Selected areas of a paper substrate were saturated with a nickel octoate solution and the entire substrate was impacted through a woven nylon ribbon. The ribbon had been saturated with a mixture containing one part rubeanic acid, three parts of dihydroabietyl alcohol and fifty parts acetone, and dried. A purple or violet-colored image was obtained on those areas of the substrate saturated with the nickel octoate solution, while no image was obtained on those areas of the substrate not so saturated.

EXAMPLE 2

A printing ink was prepared as follows:

A 10% nickel octoate solution in xylene was prepared with boiled linseed oil varnish. This printing ink, which was substantially colorless, was absorbed by a printing ribbon. A paper substrate was sensitized by pressing with the rubeanic acid mixture of Example 1. A purple or violet-colored image was again formed on the sensitized area of the paper substrate. This example, taken in view of Example 1, illustrates that either compound may be impregnated into the printing ribbon.

EXAMPLE 3

The nickel octoate solution of Example 2 was added to a lightly colored pigmented offset printing ink. The nickel octoate containing ink was selectively printed on areas of a substrate of the same color as the ink. The entire substrate was impacted through a ribbon which had been saturated with the rubeanic acid mixture of Examples 1 and 2, and dried. A colored image, of a color different from that of the substrate, was obtained on the areas of the substrate printed with the nickel octoate containing ink. This example illustrates the use of a color former or developer in a non-colorless carrier.

EXAMPLE 4

Certain leuco dyes (proton acceptors) react with certain acid-like minerals (proton donors) to form a colored image. These leuco dyes may, therefore, be used to saturate or coat a ribbon for use in an impact printer to form images on a paper substrate with sensitized areas containing the acid-like minerals. A suitable example of such a leuco dye is crystal violet lactone, which is 3,3-bis-(p-dimethyl aminophenyl)-6-dimethyl-aminophthalide. Crystal violet lactone reacts to form a blue image with the following typical acid-like mineral clays: attapulgite, kaolin, silton, bentonite and colloidal silica, or with various phenolic resins, such as, for example, a pheno-formaldehyde resin marketed by Hooker Chemical Co. under the trade name Durez Resin 24714 or a paraphenol-phenol resin sold by Reichold Chemical Co. under the trade name Varcum 523.

Other suitable leuco dyes which utilize "acid development" as a color-forming reaction include malachite green lactone, rhodamine-B-lactam and o-hydroxybenzalacetophenone.

EXAMPLE 5

U.S. Pat. No. 3,967,835 (Ozutsumi), the details of which are herein incorporated by reference provides further examples of proton acceptors which may be used in combination with acidlike minerals similar to those of Example 4 to produce colored images. U.S. Pat. No. 3,967,835 describes a benzodioxane derivative of the formula:

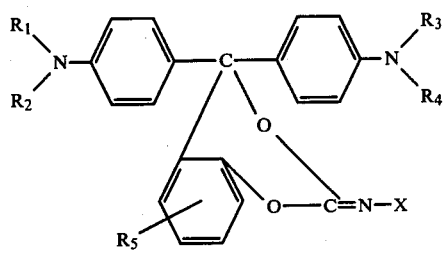

and a benzoxazine derivative of the formula:

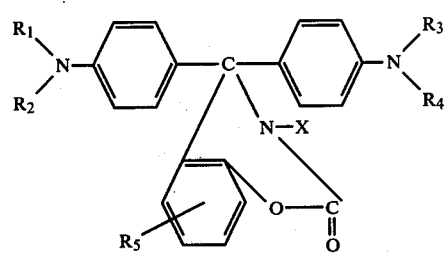

wherein $R_1$ and $R_3$, which may be the same or different, each represents a lower alkyl group having 1 to 4 carbon atoms, a benzyl group or a phenyl group, in which the aromatic nucleus of the benzyl and phenyl groups may be substituted with a lower alkyl group having 1 to 4 carbon atoms, a lower alkoxy group having 1 to 4 carbon atoms or a di-lower alkylamino group having 1 to 4 carbon atoms in each of the alkyl moieties thereof; $R_2$ and $R_4$, which may be the same or different, each represents a hydrogen atom, a lower alkyl group having 1 to 4 carbon atoms, a benzyl group or a phenyl group, in which the aromatic nucleus of said benzyl and phenyl groups may be substituted with a halogen atom or a di-lower alkylamino group having 1 to 4 carbon atoms in each of the alkyl moieties thereof; $R_5$ represents a hydrogen atom, a lower alkyl group having 1 to 4 carbon atoms, a lower alkoxy group having 1 to 4 carbon atoms, a halogen atom, a di-lower alkylamino group having 1 to 4 carbon atoms in each of the alkyl moieties thereof, a dibenzylamino group, an N-lower alkyl N-benzylamino group having 1 to 4 carbon atoms in the lower alkyl moiety thereof, an N-lower alkyl N-phenylamino group having 1 to 4 carbon atoms in the lower alkyl moiety thereof, in which the aromatic nucleus of the benzyl and phenyl groups may be substituted with a halogen atom, a lower alkyl group having 1 to 4 carbon atoms, or a lower alkoxy group having 1 to 4 carbon atoms; and X represents a lower alkyl group having 1 to 4 carbon atoms, a lower alkenyl group having 2 to 4 carbon atoms, a cyclohexyl group, an aralkyl group having 1 to 4 carbon atoms in the alkyl moiety thereof or an aryl group, in which the aromatic nucleus of said aralkyl and aryl groups may be substituted with a lower alkyl group having 1 to 4 carbon atoms, a lower alkoxy group having 1 to 4 carbon atoms, a di-lower alkylamino group having 1 to 4 carbon atoms in each of the alkyl moieties thereof, a halogen atom, a nitro group, and when the aralkyl group is a benzyl group, the aromatic nucleus thereof may also be substituted with an N-lower alkyl-N-phenyl amino group having 1 to 4 carbon atoms in the N-lower alkyl moiety thereof.

Each of the compounds of U.S. Pat. No. 3,967,835, or a mixture of the two, are proton acceptors which form color when combined with proton-donated acid clays or other proton donors such as succinic acid, maleic acid, tannic acid, or benzoic acid. Acidic polymers including carboxypolyethylene and other polymers such as phenol-aldehyde or styrene/maleic anhydride copolymer having free acid groups may also be used as proton-donating color developers.

EXAMPLE 6

Under conditions similar to those of Example 1, a color reaction may be obtained from the reaction of dimethylglyoxime and various nickel salts, including nickel octoate.

EXAMPLE 7

Certain pairs of metal salts react with each other to form a colored image, as typified by the black-brown image formed by the reaction of lead acetate and sodium sulfide.

It will be appreciated that the chemically reactive ribbon and a method of using the same provide a convenient method for the preparation of multiple ply business forms such as prestuffed inserts in sealed mailing envelopes and the simultaneous preparation of the exterior of the envelopes without requiring undesirable and/or unnecessary record plies when the user of the forms assembly does not require such record plies.

We claim:

1. A multi-ply business form, comprising
   (a) front and rear plies with inner and outer surfaces, the outer surface of said front ply being exposed;
   (b) at least one interior ply interposed between said front and rear plies;
   (c) said front ply including a coating of substantially colorless chemically reactive color forming material at first selected locations on the outer surface of said front ply comprising substantially less than the entire said front ply outer surface, the remainder of said front ply outer surface being free of color forming coating, said color forming material being adaptable to be contacted by an impact printer through a carrier of a chemically reactive material which will form a colored image when contacted with said color forming material; and
   (d) a transfer medium on the inner surface of said front ply at second selected locations thereon, said second selected locations including locations not corresponding to the first selected locations of said color forming material on said outer surface of said front ply.

2. A multi-ply business form, comprising
   (a) front and rear plies each with inner and outer surfaces, the outer surface of said front ply being exposed, said exposed front ply outer surface including a coating of a first substantially colorless material reactive with a second substantially colorless material to form colored indicia, said coating being selectively located on portions of said front ply outer surface comprising substantially less than the entire said front ply outer surface, the remainder of said front ply outer surface being free of color-forming coating;
   (b) at least one interior ply interposed between said front and rear plies; and
   (c) a transfer medium on the inner surface of said front ply at selected locations thereon, said locations including locations not corresponding to the locations of said color forming material on said front ply outer surface, whereby said business form may be utilized in an impact printing system adapted to apply said second colorless material to said front ply outer surface resulting in selective printing of colored indicia on said front ply outer surface and on said interior ply without the necessity of a record ply overlying said front ply outer surface.

3. A business form, comprising
   (a) a plurality of superimposed plies including a front ply with inner and outer surfaces, the outer surface of said front ply being exposed, said exposed front ply outer surface including a coating of a first substantially colorless material reactive with a second substantially colorless material to form colored indicia, said coating being selectively located on portions of said front ply outer surface comprising substantially less than the entire said front ply outer surface, the remainder of said front ply outer surface being free of color-forming coating; and
   (b) a transfer medium at the interface(s) of said plies at selected locations thereon, said locations including locations not corresponding to the locations of said color forming material on said front ply outer surface, whereby said business form may be utilized in an impact printing system adapted to apply said second colorless material to said front ply outer surface resulting in selective printing of colored indicia on said front ply outer surface portions only and on the remaining ply(s) at said selected locations without masking said front ply outer surface remainder.

4. A business form assembly comprising:
   (a) a plurality of superimposed plies including a front ply having an exposed front surface and an opposed rear surface facing the front of the next lower ply in the assembly;
   (b) a coating of a first material reactive with a second material to form a color different than that of either material located on part, but not all, of said front ply front surface, the second material being substantially invisible when applied to the remaining areas of said front ply front surface not provided with said first material coating; and
   (c) an image transfer medium at the interface(s) of said plies including locations not corresponding to the location of said first material coating on said front ply front surface for transferring images impacted on said front ply front surface to the front of the next lower ply at said interface(s);
   (d) whereby an impact printer may directly apply said second material in image form to said front ply front surface, including said remainder, (1) with images appearing in said different color only on said part of said front ply front surface, (2) with images appearing on the front of the next lower ply in the assembly at said locations not corresponding to the location of said first material coating on said front ply front surface, and (3) without visible images appearing on said remaining areas of said front ply front surface.

5. A continuous business form assembly comprising:
   (a) a zig-zag folded stack of a plurality of superimposed elongated plies including a front ply having an exposed front surface and an opposed rear surface facing the front of the next lower ply in the assembly, individual form lengths in the assembly being defined by cross lines of weakening in the plies;

(b) each form length having a coating of a first material reactive with a second material to form a color different than that of either material located on part, but not all, of said front ply front surface, the second material being substantially invisible when applied to the remaining areas of said front ply front surface not provided with said first material coating; and (c) each form length including an image transfer medium at the interface(s) of said plies including locations not corresponding to the location of said first material coating on said front ply front surface for transferring images impacted on said front ply front surface to the front of the next lower ply at said interface(s);

(d) whereby an impact printer may directly apply said second material in image form to said front ply front surface, including said remainder, (1) with images appearing in said different color only on said part of said front ply front surface, (2) with images appearing on the front of the next lower ply in the assembly at said locations not corresponding to the location of said first material coating on said front ply front surface, and (3) without visible images appearing on said remaining areas of said front ply front surface.

* * * * *